US011866655B2

(12) United States Patent
Panov et al.

(10) Patent No.: US 11,866,655 B2
(45) Date of Patent: Jan. 9, 2024

(54) METHOD FOR CREATING WHITE ALKANES FROM NON-PETROLEUM RENEWABLE SOURCES

(71) Applicant: HollyFrontier LSP Brand Strategies LLC, Dallas, TX (US)

(72) Inventors: Alexander Panov, Mannheim (DE); Luther Jones, Morristown, NJ (US); Clayton Rozic, Greenbackville, PA (US); Tyler McIntyre, Seven Fields, PA (US); Samuel Shouse, Petrolia, PA (US); Nicholas Venturino, Natrona Heights, PA (US); Vittoria Lopopolo, Mississauga (CA); Gregory B. Rowat, Mississauga (CA)

( * ) Notice: Subject to any disclaimer, the term of this patent is extended or adjusted under 35 U.S.C. 154(b) by 0 days.

(21) Appl. No.: 17/846,217

(22) Filed: Jun. 22, 2022

(65) Prior Publication Data

US 2023/0257666 A1    Aug. 17, 2023

Related U.S. Application Data

(60) Provisional application No. 63/310,454, filed on Feb. 15, 2022.

(51) Int. Cl.
| | |
|---|---|
| *C10G 57/02* | (2006.01) |
| *C10M 105/04* | (2006.01) |
| *C10M 177/00* | (2006.01) |
| *C10G 3/00* | (2006.01) |
| *B01D 11/04* | (2006.01) |

(Continued)

(52) U.S. Cl.
CPC .............. *C10G 57/02* (2013.01); *B01D 3/12* (2013.01); *B01D 3/143* (2013.01); *B01D 3/34* (2013.01); *B01D 11/04* (2013.01); *C10G 3/50* (2013.01); *C10M 105/04* (2013.01); *C10M 177/00* (2013.01); *C10G 2300/1011* (2013.01);
(Continued)

(58) Field of Classification Search
CPC .. C10G 57/02; C10G 3/50; C10G 2300/1011; C10G 2300/202; B01D 3/12; B01D 3/143; B01D 3/34; B01D 11/04; C10M 105/04; C10M 177/00; C10M 2203/022; C10N 2070/00
See application file for complete search history.

(56) References Cited

U.S. PATENT DOCUMENTS

| | | |
|---|---|---|
| 7,420,008 B2 | 9/2008 | Bloom |
| 7,994,107 B2 | 8/2011 | Bloom |

(Continued)

FOREIGN PATENT DOCUMENTS

| | | |
|---|---|---|
| DE | 69634442 T2 | 4/2006 |
| JP | 2005524738 A | 8/2005 |

(Continued)

*Primary Examiner* — Ali Z Fadhel
(74) *Attorney, Agent, or Firm* — JACKSON WALKER LLP

(57) ABSTRACT

The present invention describes a method to produce high purity hydrocarbon materials from renewable sources. The produced materials are chemically indistinguishable from highly refined mineral oils and/or synthetic hydrocarbons. These renewable hydrocarbon materials can be used as a drop-in replacement for mineral and synthetic hydrocarbon base oils, process fluids, white oils in products such as lubricants, rubber, personal care, pharma.

37 Claims, 4 Drawing Sheets

(51) Int. Cl.
    *B01D 3/34*    (2006.01)
    *B01D 3/12*    (2006.01)
    *B01D 3/14*    (2006.01)
    *C10N 70/00*    (2006.01)

(52) U.S. Cl.
    CPC . *C10G 2300/202* (2013.01); *C10M 2203/022* (2013.01); *C10N 2070/00* (2013.01)

(56) References Cited

U.S. PATENT DOCUMENTS

| | | |
|---|---|---|
| 8,809,610 B2 | 8/2014 | Van Beijnum et al. |
| 8,957,266 B2 | 2/2015 | Wang et al. |
| 9,598,327 B2 | 3/2017 | Myllyouja et al. |
| 9,611,554 B2 | 4/2017 | Malevich et al. |
| 10,059,887 B2 | 8/2018 | Myllyoja et al. |
| 10,550,332 B2 | 2/2020 | Myllyoja et al. |
| 10,800,976 B2 | 10/2020 | Myllyoja et al. |
| 2007/0131579 A1 | 6/2007 | Koivusalmi et al. |
| 2007/0260102 A1 | 11/2007 | Duarte Santiago et al. |
| 2010/0151535 A1* | 6/2010 | Franklin ............... C12P 7/6418 435/128 |
| 2010/0234654 A1* | 9/2010 | Wang ..................... C07C 29/149 562/509 |
| 2011/0277376 A1 | 11/2011 | Bloom et al. |
| 2013/0253243 A1* | 9/2013 | Bozzano .................. C10G 3/50 585/324 |
| 2014/0303057 A1* | 10/2014 | Abhari ................... C09K 21/08 166/305.1 |
| 2015/0361012 A1* | 12/2015 | Sohn ......................... C07C 2/66 585/323 |

FOREIGN PATENT DOCUMENTS

| | | |
|---|---|---|
| JP | 2012520377 A | 9/2012 |
| WO | WO2007068795 A1 | 6/2007 |
| WO | WO2019232604 A1 | 12/2019 |

\* cited by examiner

|  |  | WA-60 | WA-20 | WA-6 | WA-4 |
|---|---|---|---|---|---|
| Density at 15 °C, kg/l | ASTM D4052 | 0.8565 | 0.8379 | 0.8072 | 0.8006 |
| Viscosity at 40, cSt (SUS @100 °F) | ASTM D445 | 60.6 (280.6) | 22.1 (97.7) | 5.7 (26.4) | 3.7 (17.1) |
| Viscosity at 100 | ASTM D445 | 8.9 | 4.6 | 1.9 | 1.5 |
| Viscosity Index | ASTM D2270 | 117 | 124 | 141 | 194 |
| Flash Point, PM, C | ASTM D93 | 228 | 175.5 | 156 | 113 |
| Color, Saybolt | ASTM D156 | +25 | +25 | +25 | +25 |
| Limit for Aromatics and Polyaromatics | USP (white mineral oil monograph) | PASS | PASS | PASS | PASS |
| Readily Carbonizable Substances | USP (white mineral oil monograph) | PASS | PASS | PASS | PASS |

FIG. 2

METHOD FOR CREATING WHITE ALKANES FROM NON-PETROLEUM RENEWABLE SOURCES

This application is based upon and claims priority from U.S. Provisional application Ser. No. 63/310,454, filed Feb. 15, 2022, which is incorporated herein by reference.

BACKGROUND OF THE INVENTION

Field of the Invention

Applicants' invention relates to a method for producing renewable hydrocarbon fluids that have properties similar to white oil but that are derived from non-petroleum sources. Further, it relates to the purified fluids derived from the method.

Background Information

The American Petroleum Institute ("API") has categorized base oils into five (5) categories, or groups—Groups I-V (API 1509, Appendix E). Base oils often are used as lubricants, which frequently have various additives mixed with the base oil. If a base oil is classified as Group I-III, that base oil will be composed of crude petroleum oil that has been treated. As a general statement, any oil-based lubricant will be composed of 80-99% of base oil. In contrast, Groups IV and V are not derived directly from crude oil.

Certain physical properties are used to describe the characteristics of the base oils. "Viscosity" is a measure of its resistance to deformation at a given flow rate. Viscosity is usually measured in centistokes (cSt) or in other units such as Saybolt units. Viscosity can be used to define base oil grade and is determined by various methods, such as gravity flow capillary viscometer. The "viscosity-index" ("VI") relates to how much the viscosity changes with temperature—how much it thins out at higher temperatures and thickens at lower temperatures, and is determined by the variance in viscosity between 40° C. and 100° C. "Specific gravity" defines the density of oil relative to water and is measured by a hydrometer. The base oils' "flash point" describes its high-temperature, flammability property, and is the temperature at which a flash surface flame occurs. Finally, "pour point" defines the lowest temperature at which an oil is observed to flow by gravity in a specified lab test. Specifically, the pour point is 3 degrees C. (5 degrees F.) above the temperature at which the oil shows no movement when a lab sample container is held horizontally for 5 seconds.

Group I base oils are refined from petroleum crude oil, but are the least refined base oil. Group I base oils are solvent-refined, which is a simpler refining process, and Group I base oils typically range from amber to golden brown in color due to the Sulphur, nitrogen and ring structures remaining in the oil. Two main characteristics of Group I base oils are that they are composed of one or both of: less than 90% saturates and/or greater than 0.03% sulfur. Group I base oils have a VI range of 80 to 120.

Group II base oils are defined as being, both, more than 90% saturates and less than 0.03% sulfur. They are created by using a hydrotreating process to replace the traditional solvent-refining process, which is a more complex process than what is used for Group I base oils. Hydrogen gas is used to remove undesirable components from the crude oil. This results in a clear, clearer than Group I base oils, and colorless base oil with very few Sulphur, nitrogen or ring structures. All the hydrocarbon molecules of Group II base oils are saturated, giving them better antioxidation properties. The VI of Group II base oils index ranges from 80 to 120, but is typically above 100.

Group III base oils are greater than 90 percent saturates, less than 0.03 percent sulfur. These oils are refined using a hydrogen gas process to clean up the crude oil even more than Group II base oils, and generally are severely hydro-cracked (higher pressure and heat). This longer process is designed to achieve a purer base oil. The resulting base oil is clear and colorless. Group III base oils are more resistant to oxidation than Group I oils. The VI of Group III base oils index is above 120. Group III base oils are considered mineral oils by many technical people because they are derived directly from the refining of crude oil. However, they are considered synthetic base oils by other people for marketing purposes due to the belief that the harsher hydrogen process has created new chemical oil structures that were not present before the process.

Group IV base oils are full synthetic (polyalphaolefin) oils. Polyalphaolefins ("PAO") are made through a process called synthesizing using pure chemicals created in a chemical plant as opposed to being created by distillation and refining of crude oil. They have a much broader temperature range and are great for use in extreme cold conditions and high heat applications. PAOs have a VI of greater than 120.

Group V base oils are classified as all other base oils that are not classified as belonging in Groups I-IV. These base oils are at times mixed with other base stocks to enhance the oil's properties. Common Group V base oils include naphthenic base oils, various synthetic esters, polyalkylene glycols (PAGs), phosphate esters, silicone, phosphate ester, polyolester, biolubes, and various other chemistries fall into this group.

The terms base stocks and base oils are often used interchangeably, but there are differences. A base stock is a single product, usually defined by its viscosity grade. A mixture of one or more base stocks in a finished lubricant is a base oil. A base oil is always defined in the context in the formulated lubricant. Base oil properties can vary depending on their API group.

Mineral oil can also be obtained as a distillation product made from highly refined, purified, distilled, and processed petroleum. It is an inert, chemically stable compound. Mineral oil is also known by the terms "paraffinum perliquidum" for light mineral oil and "paraffinum liquidum" or "paraffinum subliquidum" for somewhat more viscous varieties. Various mineral oils are combinations of paraffins, naphthenes, and aromatic oils that are clear, colorless, oily, almost tasteless, water-insoluble liquid, usually of either a standard light density (light mineral oil) or a standard heavy density (heavy mineral oil). Mineral oil is an inert, stable compound that is often used as an ingredient used in baby lotions, cold creams, ointments, lubricants, cosmetics, moisturizers, laxatives, and many other cosmetic and personal care products. Mineral oil is also used in the manufacture of some basic foods. It is used as a binding agent, but can also be applied to grains like wheat, rice, oats and barley to help keep dust from adhering to the product. Mineral oil is also an ingredient in some types of gummy candies to keep them from sticking together.

White oil is a mineral oil that is colorless, odorless, tasteless mineral oils, and is used especially in medicine and in pharmaceutical and cosmetic preparations. White mineral oils are a highly refined petroleum mineral oil. White mineral oils mostly consist of saturated hydrocarbons. Different methods of purifying are applied: hydrogenation, hydro-isomerization, or sulfur trioxide ($SO_3$), sulfuric acid, or oleum treatment of petroleum products, or a combination of the above. White mineral oils are used in many applications in personal care, pharma, food industry (including lubricants), and many other applications where non-toxic oil with low biological activity and high stability is required.

White oil consists of a complex combination of hydrocarbons obtained from the intensive treatment of a petroleum fraction with sulfuric acid and oleum, or by hydrogenation, or by a combination of hydrogenation and acid treatment. Additional washing and treating steps may be included in the processing operation. It consists of saturated hydrocarbons having carbon numbers predominantly in the range of C15 through C50. The term "white oil" is a misnomer, in that white oils are clear, and tend to be water white (Saybolt color +30), and meet guidelines established by the Food and Drug Administration (FDA) in the Code of Federal Regulations (CFR). 21 CFR 172.878 and 21 CFR 178.3620(a) They meet the purity requirements of the European Pharmacopoeia (EuP), United States Pharmacopoeia (USP), and Japanese Pharmacopoeia (JP). Moreover they are in compliance with the purity requirements of former monographs of the BP, DAB or French Codex. Typical properties of white oils include: density from 810-890 kg/$m^3$ at 20° C. (using the standard test for density ASTM D-1298), viscosity from 3-240 cSt at 40° C. (using the standard test for viscosity ASTM D-445), pour point from −18-+3° C. (using the standard test for pour point ASTM D-97), flash point from 115-290° C. (using the standard test for flash point ASTM D-92). (Other standards and tests exist for these properties as well.)

Conventional methods using renewable materials are not "drop-in" replacement for mineral and synthetic PAO oil and produce products with inferior quality and hence are only suited to limited applications. Today, the renewable based alternatives for petroleum base oils, process fluids, and white oils are usually based on vegetable oils or products derived from chemical modification of vegetable oils (for example, di-esters and polyol esters). These products possess reactive ester groups that negatively affect the properties of the final product. Hence these materials often don't deliver the same performance as mineral oils in conventional lubricating and other industrial applications.

SUMMARY OF THE INVENTION

The present invention includes the process of producing hydrocarbon material from renewable sources that are not sourced from petroleum (or crude oil) and meeting all or part of the technical requirements of white mineral oil specifications (European (EuP), United States (USP), Japanese Pharmacopoeia (JP), former monographs of the BP, DAB or French Codex). The present invention also includes producing the resultant substance using the method. The resulting substance is called a White Alkanes, which is generally a liquid (some products are waxy) and has white oil-like characteristics.

As used herein, "White Alkane" or "White Alkanes" is the resultant product after subjecting renewable sources to the described processes, and where the White Alkanes are inert and have all or some of: specified feed materials, carbon chains with a given range of numbers of carbon molecules, viscosities in a given range, UV absorption, aromatics, color, readily carbonizable substances, improved pour points, improved flash points, a clear (or generally clear) appearance, specific gravity/relative density, acidity/alkalinity, no, or virtually no, remaining sulfur compounds, where the ranges and requirements are further described herein.

The resulting White Alkanes come from polymerized vegetable oils or dimer fatty acids or similar materials containing hydrocarbon chains in C12-C100 range for use in various applications, including for personal care products and lubricants. The method economically produces high purity renewable base oils or hydrocarbons on a large scale.

Conventional, feed materials that are renewable replacements for petroleum based base oils, process fluids, and white oils are usually based on vegetable oils or products derived from chemical modification of vegetable oils such as diesters and polyol esters. These feed materials possess relatively higher reactivity that negatively affects the properties of the final product.

The method of the present invention is expected to efficiently produce higher purity hydrocarbons from renewable feed materials than other methods of renewable hydrocarbon production. The hydrocarbon material product of the present invention, White Alkanes, will possess hydrocarbons with most or all of the properties of white mineral oils.

As used herein, "renewable" (which may also be referred to as "renewable sources" or "renewable carbon") may include polymerized vegetable oils, polymerized fatty acids, polymerized fatty acid esters, or a mixture thereof. The renewable carbon in the feed material may be chosen from, in part, from the polymerized vegetable oils, polymerized fatty acids, polymerized fatty acid esters, or a mixture thereof. Vegetable oils are generally triglycerides (glycerol esters) which are esters of glycerol and various acid referred to as fatty acids that range from carbon chain lengths of C12-C24 and have additional functional groups such as double bonds, or hydroxyl groups as in castor oil. Vegetable oils are produced in oilseed crops and fruits such as olive or palm, palm kernel and coconut. Alternatively, the feed material is a naturally occurring oil or material containing 50% or more of unsaturated fatty acid components including mono-, di-, and tri-unsaturated hydrocarbon chains, with a majority of their fatty acids in the C16-C22 range. In general however, "renewable" or "renewable sources" or "renewable carbon" includes all carbon sources that do not use fossil carbon from the geosphere. Fossil carbon is generally petroleum—or coal, crude oil, and natural gas. Fossil carbon generally comes from decomposing plants and animals and is found in the Earth's crust, and thus comes from the geosphere. In contrast, renewable carbon comes from the biosphere, atmosphere, or technosphere—but not from the geosphere.

In one embodiment of the invention, vegetable oils containing short chain length, unsaturated fatty acid chains are polymerized. Polymerization can be conducted by thermal treatment without or with presence of oxygen (O2) or air, and with or without a catalyst. The sources may be triglycerides and fatty acid components chosen from one or more natural sources such as: soy, canola, castor, corn, cottonseed, crambe, linseed, olive, peanut, rapeseed, safflower, sunflower, tall oil fatty acid, coconut, palm; oils derived from seeds, pulp, beans, legumes, rinds, pits or any part of an oil bearing fraction of the intended plant; animal fats or fish oils, or a mixture thereof. These oils contain 50% or more of unsaturated fatty acid components including mono-, di-, and tri-unsaturated hydrocarbon chains, with a majority of their fatty acids in the C16-C22 range (C18 is typical for vegetable oil) that can be desirable for most applications, with final product carbon chains of generally greater than C12 or C18 or C30 or C60 up to C100 being the target range after the process for the product.

Other naturally occurring oils or materials generally containing unsaturated hydrocarbon chains can also be used. Feed materials containing high levels of saturated hydrocarbon chains will give lower yields of the hydrocarbons usable as base oils, white oils, and process fluids, they will produce higher amount of renewable diesel. For example, animal fat, coconut oil, palm oil contain high level of saturation and will produce high amounts of renewable diesel fuel during the process.

The polymerized vegetable oil is hydro-decarboxylated, and/or hydro-deoxygenated, which will result in production of hydrocarbons suitable for production of lubricants, or use in personal care product formulas, or as process oils.

Polymerized fatty acid and fatty acid esters can also be used as a feed in the hydro-decarboxylation, and/or hydro-deoxygenation step.

As an example, the process flow for using vegetable oil flows from vegetable oil to polymerized vegetable oil using heat or heat and a catalyst. Then, the products of the first step are hydrogenated and treated by different technologies to produce hydrocarbon materials, propane, and water. The hydrocarbon may or may not contain saturated carbon rings.

The resultant substance, White Alkane, has white oil quality. It is created generally from 50%-400% renewable carbon and hydrocarbon based materials, but in order to produce a higher quality product it is preferable to use 80%-100% renewable carbon and hydrocarbon based materials. The White Alkanes have the same inert hydrocarbon benefits as mineral oil and it is derived from natural ingredients per ISO 16128.

The resultant substance, White Alkane, has viscosities in a range (at 40° C.) from 2 cSt to 60 cSt and higher. The preferred viscosities of 12 cSt-70 SUS, 16 cSt-90 SUS, 40 cSt-209 SUS, or 60+ cSt-350+ SUS. Where cSt (or centistokes) is a unit of measure for viscosity is one millimeter squared per second (1 cSt=1 mm$^2$/s). While SUS (or Saybolt Universal Seconds) is the time in seconds for 60 milliliters (mL) of oil to flow through a standard orifice at a given temperature. cSt and SUS viscosity units are convertible between one another.

The produced renewable hydrocarbons will be used in the following applications where a renewable content is required, such as:
 a. personal care products and pharma;
 b. lubricants;
 c. process fluids;
 d. white oils;
 e. components of agricultural products such as pesticides and spray oils; and
 f. any other use that may require hydrocarbon materials.

Unlike esterified fatty acids or purified vegetable oils, the proposed process produces "drop-in replacement" hydrocarbon materials and products of the same or better quality than mineral oils, white oils, or PAO.

The feed materials are selected with the highest possible content of polymerized hydrocarbon chains. During the method, it is desirable that hydrogen pressure 500-4000 psi and temperature 400° F.-800° F. and LHSV (LHSV is the liquid hourly space velocity, which is the ratio of liquid volume flow per hour to catalyst volume. A system with a flow rate 2 cu m/h and 1 cu m of catalyst would have an LHSV of 2.) of the hydrogenation process be 0.5-5 l/h. Further, the catalyst composition for hydrogenation should be Ni, Mo/Al$_2$O$_3$, or Ni, Co/Al$_2$O$_3$, Ni/Al$_2$O$_3$ or other metal based on catalyst support.

Hydrogenation can be conducted in several steps starting with milder conditions in order to decrease cracking reaction and increase the yield of hydrocarbons with targeted hydrocarbon chains (C18 and higher). For example feed can first be treated at 20-4000 psi and temperature 200° F.-800° F. and LHSV of 0.5-5 l/h.

If acid dimers are used, a dilution maybe needed to reduce acid number of the feed, and esterification or other chemical treatment to the dimer maybe beneficial to reduce acid number and increase the catalyst stability. The produced materials will be hydrocarbons, that may or may not contain saturated rings and traces of aromatics, and should have a range of carbon atoms from C12 to C100. A more likely embodiment would use C10 to C50, with C15 to C40 being the most common. The resulting material is further purified by different methods in order to remove any aromatic compounds, unreacted oxygenated hydrocarbons and produce White Alkanes of desired properties.

The White Alkanes product is a white oil quality material, and meets some or all of the following requirements: UV absorption, aromatics, color, readily carbonizable substances, and other white oil requirements. The percentage of renewable carbon in the White Alkanes is between 50%-100%, although it is more desirable between 80%-100%, and is preferably between 90%-100%. The starting feedstock is selected sources having C12-C100 carbon chains, with significant portion of HC chains being in C20 to C36 range.

In a substantial number of embodiments of the described method, a ketonization step, an isomerization step, a transesterification step following polymerization, a transesterification step following polymerization or of the any polymerized vegetable oils, and/or a hydroisomerization step are unnecessary. Polymerizing the feed material may be accomplished using heat, or a catalyst, or heat and a catalyst, prior to hydro-decarboxylating the feed material, and prior to hydro-deoxygenating the feed material.

Feedstocks from the biosphere, such as plant fats, plant oils, plant waxes, animal fats, animal oils, animal waxes, fish fats, fish oils, fish waxes, free fatty acids or fatty acids obtained by hydrolysis of the same, esters obtained by transesterification of the same, fatty acid alkyl esters obtained by esterification of alcohols with fatty acids of the same, fatty acid metal salts obtained by saponification of the same, alcohols and aldehydes obtained as reduction or hydrogenolysis products of the same, fatty alcohols obtained by hydrolysis, transesterification and pyrolysis from waxes of biological origin, anhydrides of fatty acids from the same, and waste and recycled food grade fats and oils, do not typically contain hydrocarbon chains longer than C22 and are not advantageous for the described method.

In a substantial number of embodiments of the described method, glycerol is not produced, and thus separation is unnecessary. Likewise, the intermediate product of the present method does not have an iodine value of 25 to 110, and a liquid fraction is not separated from the intermediate product of the present method.

Thus, the production of hydrocarbon material using renewable carbon as the feed material includes selecting the feed material (which can come from many sources as described herein). The feed material is generally already polymerized, but if it is not, it can be polymerized as part of the method. The feed material is then subjected to a hydro treatment, which is a two-part step comprising hydro-decarboxylating and hydro-deoxygenating the feed material. These two (2) steps can result in a first intermediate.

The first intermediate can contain a mixture of molecules, or chemicals, and in some instances the first intermediate can have the characteristics sufficient to be classified as a White Alkane. The first intermediate may be subjected to a separating step in which one or more of the components, or different molecules, in the first intermediate can be separated from the remainder—creating a second intermediate. The typical components that are separated and removed from either the first intermediate or second intermediate may include: wax, linear alkanes, and/or light boiling alkanes. Several separation techniques can be used on the first intermediate, including any one or more of: solvent dewaxing, urea dewaxing, distilling, fractionating, fractional crystallization, or light fraction stripping. As an example, solvent dewaxing processes can be used to remove wax from oils to give the product good fluidity characteristics at low temperatures.

The second intermediate may, in some instances, have the characteristics sufficient to be classified as a White Alkane. The first intermediate, or second intermediate, may also be subjected to a purification step, in which impurities are removed. The purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration.

It should be noted that a White Alkane may be produced after hydro treatment, after hydro treatment and either separating, or purifying, or after all three (3) steps hydro treatment, separating, and purifying have been completed. Additionally, the separating and purifying steps may be completed in any order.

BRIEF DESCRIPTION OF THE DRAWINGS

FIG. 2 is a chart that illustrates selected characteristics of variations of the White Alkanes.

DETAILED DESCRIPTION OF THE PREFERRED EMBODIMENT

Figure 1:
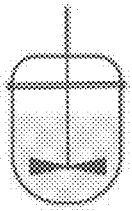
FIG. 1 illustrates the method of the present invention.

Referring to the figures, FIG. 1 illustrates the steps that could be applied in the present invention. 1. Refined vegetable oil and biodiesel need to be polymerized. Already polymerized materials can also be used. 2. The initial hydro-de-oxygenation step produces a mixture of hydrocarbons, typical conditions can be: hydrogen pressure 500-4000 psi and temperature 400° F.-800° F. and LHSV of the hydrogenation process be 0.5-5 l/h over NiMo, CoMo, Ni, Co, or other metal Catalyst supported on Alumina, Silica silica-alumina or zeolite support or other hydrogenation catalysts can be used. 3. If required, the hydrocarbons produced in the second step maybe separated by distillation or solvent dewaxing. This step can produce hydrocarbons of different viscosity and cold temperature properties. Fractions with atmospheric boiling temperature up to 450° C. or higher can be separated if higher viscosity products are desired. Separation of lower molecular weight linear alkanes of C15-C18 range by distillation is also used here to improve the pour point of the resulting product. Solvent dewaxing is an alternative method for removing waxy alkanes, improving cold temperature properties, and increasing the viscosity of the final products. 4. In the product purification step, hydro-finishing is used, typically run at 400° F.-700° F., 2000-7000 psi, 1.0 LHSV. Nickel catalyst or noble metal (for example Pt, Pd) supported on Silica, Alumina, Silica-Alumina, Zeolite supported catalysts are typically used. This step is desirable in order to remove aromatic and heteroatom organic compounds (typically oxygen containing aromatic compounds). The product purification step can also be performed by applying SO3, oleum, or sulfuric acid wash process. 5. If required, bauxite filtration is used as a final purification step.

The present invention uses a feed selection step. The feed selection step comprises selecting high natural content products, or feed, containing hydrocarbon chains with lengths from C10-C100. These may also be separated into more distinct groups where the feed material that that contains hydrocarbon chains with lengths of at least one of: C10 to C20, C20 to C30, C30 to C50, C50 to C70, C70 to C100. Generally, if higher viscosity product is desired, the feed material should contain longer hydrocarbon chains. The feed may be chosen from one, or a combination, of polymerized vegetable oils, polymerized fatty acids, and polymerized fatty acid esters to create an intermediate product.

The intermediate product is treated with an initial hydrogenation step. In the initial hydrogenation step, unsaturated C=C bonds are saturated through a reaction with hydrogen and oxygen atoms are converted to water by reacting with hydrogen. As a part of the initial hydrogenation step, carbonyls present in the feed stock (a carbonyl group is a functional group composed of a carbon atom double-bonded to an oxygen atom: C=O) can also be converted to CO2. Carbon atoms connected to oxygen are saturated with hydrogen. Hydrocracking of the intermediate product into smaller molecules may be a part of the initial hydrogenation and hydro-deoxygenation/decarboxylation step. The initial hydrogenation and the hydro-deoxygenation/decarboxylation step(s) are one process.

Hydrocracking is a process by which the hydrocarbon molecules of petroleum are broken into simpler molecules by the addition of hydrogen under high pressure and in the presence of a catalyst.

By controlling selectivity toward hydrocracking, the molecular distribution and the viscosity of the resulting product is controlled. The initial hydrogenation may be done in two steps or over the layered catalyst bed in order to control the rate of hydrocracking. The layered catalyst bed consists of multiple catalysts, or reactors connected in series.

An isomerization step may be applied in order to improve pour point of the product obtained in the initial hydrogenation step.

A product separation step can occur after initial hydrogenation, the mix of products can be separated by solvent dewaxing. Solvent dewaxing separates waxy n-paraffins from liquid iso-paraffins and cyclo-paraffins. The solvent dewaxing improves the product pour point of the White Alkanes. Solvent dewaxing also removes light n-paraffins and increases viscosity and increases flash point of the White Alkanes. Light fraction can be removed by stripping, this also improves flash point, pour point, and increases viscosity.

A fractionation step can be applied to the product where it is fractionated (distilled) in order to separate products of different viscosity ranges. Removing of lower molecular weight linear alkanes (typically of C15-C18 range) by distillation is also used here for improving the pour point of the resulting product.

A second stage purification step after the initial hydrotreatment step or product separation steps where the intermediate product goes through additional purification by hydro-finishing. This second stage purification helps produce White Alkanes with white oil quality. The second stage purification step can accomplished by a treatment. The treatment may consist of at least one of: hydro finishing, applying sulfur trioxide, applying oleum, or a sulfuric acid washing said second intermediate product.

Finally, in a filtering step, the product may be filtered through bauxite, palygorskite mineral, bentonite clay, kaolin clay, activated carbon or subjected to clay-gel extraction, in order to remove trace impurities. The filtering step may also improve the appearance and clarity of the White Alkanes.

FIG. 2 is a chart that illustrates selected characteristics of variations of the White Alkanes. In this chart, WA stands for "White Alkanes." White Alkanes are renewable hydrocarbons. The viscosity range of the White Alkanes product should meet, but not be limited to:
  a. US Pharmacopoeia USP <911> for Mineral Oil: 34.5-150.0 cSt;
  b. Light Mineral Oil: 3.0-34.4 cSt;
  c. European Pharmacopée Ph. EUR. <2.2.9>: P. Liquidium: 110-230 mPa-s (millipascal-second) (Dynamic viscosity is the resistance to movement of one layer of a fluid over another and may be measured using the Pascal second); and
  d. P. Subliquidium: 25-80 mPa-s.

Other characteristics of the White Alkanes include, without limitation, a specific gravity/relative density that meets the requirements of United States Pharmacopoeia per USP/NF <841>, and meets the requirements of European Pharmacopoeia Ph. Eur. <2.2.5>. The acidity/alkalinity of the White Alkanes should meet the requirements of US Pharmacopoeia USP/National Formulary (NF) <M02> and European Pharmacopoeia Ph. Eur. <M01>. The White Alkanes have no, or virtually no, remaining Sulfur compounds, and meets the requirements of US Pharmacopoeia and FDA USP/NF <M04>. The White Alkanes also meet the requirements for ultraviolet (UV) absorption and Saybolt color found in 21 CFR 178.3620 (and for Saybolt color in the requirements of FDA test per ASTM D156).

Figure 3:
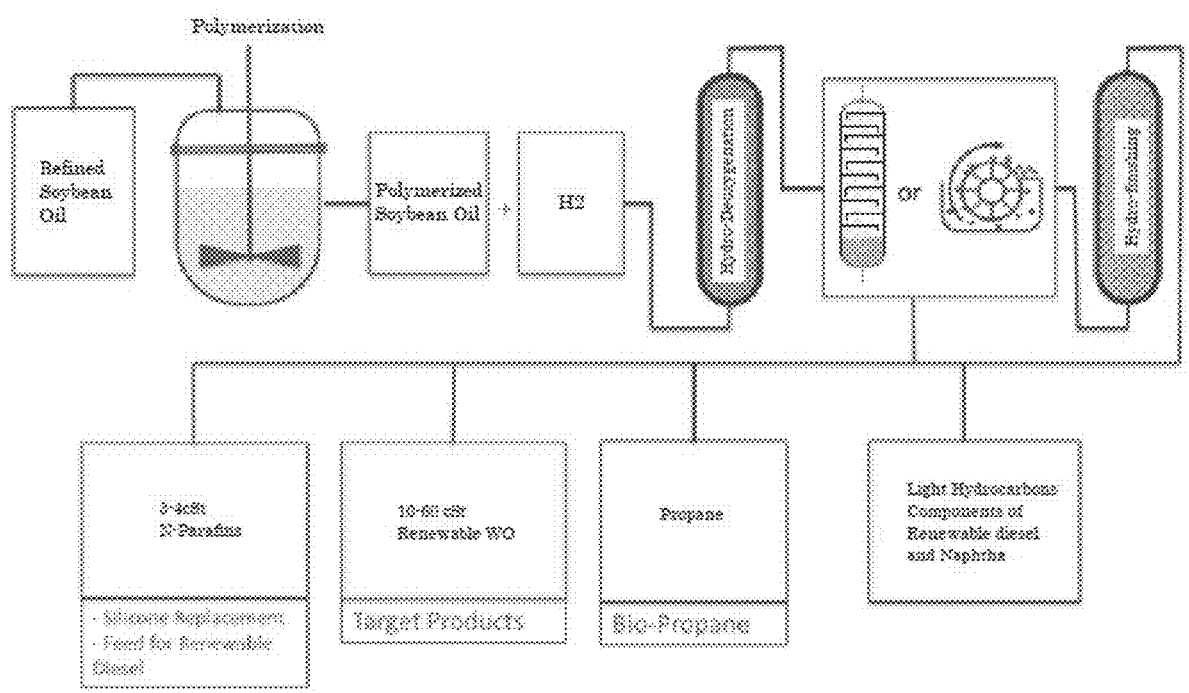
FIG. 3 is a schematic of a first embodiment of a production process of the White Alkanes.
Figure 4:
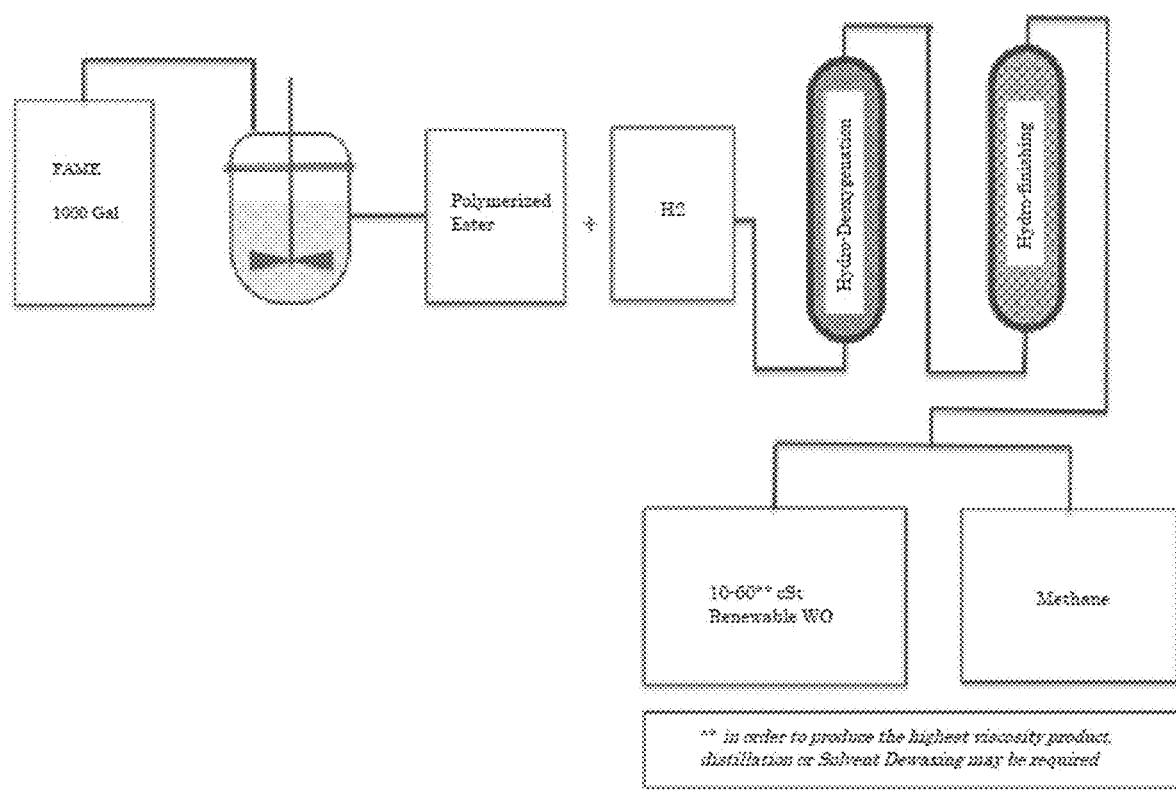
FIG. 4 is a schematic of a second embodiment of a production process of the White Alkanes.

FIG. 3 and FIG. 4 are schematics of sample processes of production of the White Alkanes. The final product, or White Alkanes, is the resultant of the inventive method. The White Alkanes is a hydrocarbon with renewable carbon content of between than 50% to 100%, and containing naphthenic and paraffinic carbons in a desired ratio. The White Alkanes is similar in quality to white oil and meets the requirements of the quality level set for white mineral oils per USP/NF Compendia, US Food and Drug Administration CFR, European Pharmacopoeia Monographs. Some grades may not meet the Solid paraffin requirements as they may not be critical for all applications. But, the White Alkanes meets the requirements for food additives of the Food and Drug Administration (FDA) per 21 CFR 172.878.

Byproducts of the described method may include wax n-paraffin C12-C100, propane or methane or ethane with 0 to 100% renewable carbon content, or diesel or gasoline with 50-100% renewable carbon content.

When the terms "substantially," "approximately," "about," or "generally" are used herein to modify a numeric value, range of numeric values, or list numeric values, the term modifies each of the numerals. Unless otherwise indicated, all numbers expressing quantities, units, percentages, and the like used in the present specification and associated claims are to be understood as being modified in all instances by the terms "approximately," "about," and "generally." As used herein, the term "approximately" encompasses +/−5 of each numerical value. For example, if the numerical value is "approximately 80," then it can be 80+/−5, equivalent to 75 to 85. As used herein, the term "about" encompasses +/−10 of each numerical value. For example, if the numerical value is "about 80," then it can be 80+/−10, equivalent to 70 to 90. As used herein, the term "generally" encompasses +/−15 of each numerical value. For example, if the numerical value is "about 80," then it can be 80%+/−15, equivalent to 65 to 95. Accordingly, unless indicated to the contrary, the numerical parameters (regardless of the units) set forth in the following specification and attached claims are approximations that may vary depending upon the desired properties sought to be obtained by the exemplary embodiments described herein. In some ranges, it is possible that some of the lower limits (as modified) may be greater than some of the upper limits (as modified), but one skilled in the art will recognize that the selected subset will require the selection of an upper limit in excess of the selected lower limit.

At the very least, and not limiting the application of the doctrine of equivalents to the scope of the claim, each numerical parameter should at least be construed in light of the number of reported significant digits and by applying ordinary rounding techniques.

The terms "inhibiting" or "reducing" or any variation of these terms refer to any measurable decrease, or complete inhibition, of a desired result. The terms "promote" or "increase" or any variation of these terms includes any measurable increase, or completion, of a desired result.

The term "effective," as that term is used in the specification and/or claims, means adequate to accomplish a desired, expected, or intended result.

The terms "a" or "an" when used in conjunction with the term "comprising" in the claims and/or the specification may mean "one," but it is also consistent with the meaning of "one or more," "at least one," and "one or more than one."

The term "each" refers to each member of a set, or each member of a subset of a set.

The terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

In interpreting the claims appended hereto, it is not intended that any of the appended claims or claim elements invoke 35 U.S.C. 112(f) unless the words "means for" or "step for" are explicitly used in the particular claim.

It should be understood that, although exemplary embodiments are illustrated in the figures and description, the principles of the present disclosure may be implemented using any number of techniques, whether currently known or not. The present disclosure should in no way be limited to the exemplary implementations and techniques illustrated in the drawings and description herein. Thus, although the invention has been described with reference to specific embodiments, this description is not meant to be construed in a limited sense. Various embodiments may include some, none, or all of the enumerated advantages. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention. Modifications, additions, or omissions may be made to the systems, apparatuses, and methods described herein without departing from the scope of the disclosure. For example, the operations of the systems and apparatuses disclosed herein may be performed by more, fewer, or other components in the methods described may include more, fewer, or other steps. Additionally, steps may be performed in any suitable order.

We claim:

1. A method of producing hydrocarbon material called a White Alkane, wherein said White Alkane has the following properties: density from 810-890 kg/m$^3$ at 20° C. (using the standard test for density ASTM D-1298), viscosity from 3-240 cSt at 40° C. (using the standard test for viscosity ASTM D-445), pour point from −18-+3° C. (using the standard test for pour point ASTM D-97), flash point from 115-290° C. (using the standard test for flash point ASTM D-92), comprising:
    selecting a feed material, wherein said feed material contains renewable carbon;
    hydro-decarboxylating said feed material;
    hydro-deoxygenating said feed material;
    wherein a first intermediate is produced; and
    wherein said first intermediate can be made up of a mixture of molecules.

2. The method of claim 1, wherein said first intermediate is a White Alkane.

3. The method of claim 1, further comprising selecting said feed material that that contains hydrocarbon chains with lengths of at least one of: C10 to C20, C20 to C30, C30 to C50, C50 to C70, C70 to C100.

4. The method of claim 1, further comprising polymerizing said feed material using heat, a catalyst, or heat and a catalyst, prior to hydro-decarboxylating said feed material, and prior to hydro-deoxygenating said feed material.

5. The method of claim 1, wherein said feed material contains a renewable carbon that comes from at least one of the biosphere, atmosphere, or technosphere.

6. The method of claim 1, wherein said feed material renewable carbon is chosen from the group comprising: polymerized vegetable oils, polymerized fatty acids, polymerized fatty acid esters, triglycerides, diglycerides, monoglycerides, organic esters or a mixture thereof.

7. The method of claim 1, wherein said feed material chosen from the group comprising: soy, canola, castor, corn, cottonseed, crambe, linseed, olive, peanut, rapeseed, safflower, sunflower, tall oil fatty acid, coconut, palm; oils derived from seeds, pulp, beans, legumes, rinds, pits or any part of an oil bearing fraction of the intended plant; animal fats or fish oils, or a mixture thereof.

8. The method of claim 1, wherein said feed material is a naturally occurring oil or material containing 50% or more of unsaturated fatty acid components including mono-, di-, and tri-unsaturated hydrocarbon chains, with a majority of their fatty acids in the C16-C22 range.

9. The method of claim 1, further comprising:
    separating said first intermediate into different components, and removing wax, linear alkanes, or light boiling alkanes from said first intermediate;
    wherein said separating step is accomplished by at least one of: solvent dewaxing, urea dewaxing, distilling, fractionating, fractional crystallization, or light fraction stripping said first intermediate product; and
    wherein a White Alkane is produced.

10. The method of claim 3, further comprising:
    separating said first intermediate into different components and removing wax, linear alkanes, or light boiling alkanes from said first intermediate;
    wherein said separating step is accomplished by at least one of: solvent dewaxing, urea dewaxing, distilling, fractionating, fractional crystallization, or light fraction stripping said first intermediate product; and
    wherein a second intermediate is produced.

11. The method of claim 4, further comprising:
    separating said first intermediate into different components and removing wax, linear alkanes, or light boiling alkanes from said first intermediate;
    wherein said separating step is accomplished by at least one of: solvent dewaxing, urea dewaxing, distilling, fractionating, fractional crystallization, or light fraction stripping said first intermediate product; and
    wherein a second intermediate is produced.

12. The method of claim 5, further comprising:
    separating said first intermediate into different components and removing wax, linear alkanes, or light boiling alkanes from said first intermediate;
    wherein said separating step is accomplished by at least one of: solvent dewaxing, urea dewaxing, distilling, fractionating, fractional crystallization, or light fraction stripping said first intermediate product; and
    wherein a second intermediate is produced.

13. The method of claim 6, further comprising:
    separating said first intermediate into different components and removing wax, linear alkanes, or light boiling alkanes from said first intermediate;
    wherein said separating step is accomplished by at least one of: solvent dewaxing, urea dewaxing, distilling, fractionating, fractional crystallization, or light fraction stripping said first intermediate product; and
    wherein a second intermediate is produced.

14. The method of claim 7, further comprising:
    separating said first intermediate into different components and removing wax, linear alkanes, or light boiling alkanes from said first intermediate;
    wherein said separating step is accomplished by at least one of: solvent dewaxing, urea dewaxing, distilling, fractionating, fractional crystallization, or light fraction stripping said first intermediate product; and
    wherein a second intermediate is produced.

15. The method of claim 8, further comprising:
    separating said first intermediate into different components and removing wax, linear alkanes, or light boiling alkanes from said first intermediate;
    wherein said separating step is accomplished by at least one of: solvent dewaxing, urea dewaxing, distilling, fractionating, fractional crystallization, or light fraction stripping said first intermediate product; and
    wherein a second intermediate is produced.

16. The method of claim 3, further comprising:
    separating said first intermediate into different components and removing wax, linear alkanes, or light boiling alkanes from said first intermediate;
    wherein said separating step is accomplished by at least one of: solvent dewaxing, urea dewaxing, distilling, fractionating, fractional crystallization, or light fraction stripping said first intermediate product; and
    wherein a White Alkane is produced.

17. The method of claim 4, further comprising:
    separating said first intermediate into different components and removing wax, linear alkanes, or light boiling alkanes from said first intermediate;
    wherein said separating step is accomplished by at least one of: solvent dewaxing, urea dewaxing, distilling, fractionating, fractional crystallization, or light fraction stripping said first intermediate product; and
    wherein a White Alkane is produced.

18. The method of claim 5, further comprising:
separating said first intermediate into different components and removing wax, linear alkanes, or light boiling alkanes from said first intermediate;
wherein said separating step is accomplished by at least one of: solvent dewaxing, urea dewaxing, distilling, fractionating, fractional crystallization, or light fraction stripping said first intermediate product; and
wherein a White Alkane is produced.

19. The method of claim 6, further comprising:
separating said first intermediate into different components and removing wax, linear alkanes, or light boiling alkanes from said first intermediate;
wherein said separating step is accomplished by at least one of: solvent dewaxing, urea dewaxing, distilling, fractionating, fractional crystallization, or light fraction stripping said first intermediate product; and
wherein a White Alkane is produced.

20. The method of claim 7, further comprising:
separating said first intermediate into different components and removing wax, linear alkanes, or light boiling alkanes from said first intermediate;
wherein said separating step is accomplished by at least one of: solvent dewaxing, urea dewaxing, distilling, fractionating, fractional crystallization, or light fraction stripping said first intermediate product; and
wherein a second intermediate White Alkane is produced.

21. The method of claim 8, further comprising:
separating said first intermediate into different components and removing wax, linear alkanes, or light boiling alkanes from said first intermediate;
wherein said separating step is accomplished by at least one of: solvent dewaxing, urea dewaxing, distilling, fractionating, fractional crystallization, or light fraction stripping said first intermediate product; and
wherein a second intermediate White Alkane is produced.

22. The method of claim 10, further comprising:
purifying said second intermediate product;
wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said second intermediate product;
wherein said purifying causes impurities to be removed from said second intermediate product; and
wherein a White Alkane is produced.

23. The method of claim 11, further comprising:
purifying said second intermediate product;
wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said second intermediate product;
wherein said purifying causes impurities to be removed from said second intermediate product; and
wherein a White Alkane is produced.

24. The method of claim 12, further comprising:
purifying said second intermediate product;
wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said second intermediate product;
wherein said purifying causes impurities to be removed from said second intermediate product; and
wherein a White Alkane is produced.

25. The method of claim 13, further comprising:
purifying said second intermediate product;
wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said second intermediate product;
wherein said purifying causes impurities to be removed from said second intermediate product; and
wherein a White Alkane is produced.

26. The method of claim 14, further comprising:
purifying said second intermediate product;
wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said second intermediate product;
wherein said purifying causes impurities to be removed from said second intermediate product; and
wherein a White Alkane is produced.

27. The method of claim 15, further comprising:
purifying said second intermediate product;
wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said second intermediate product;
wherein said purifying causes impurities to be removed from said second intermediate product; and
wherein a White Alkane is produced.

28. The method of claim 1, further comprising:
purifying said second intermediate product;
wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said second intermediate product;
wherein said purifying causes impurities to be removed from said second intermediate product; and
wherein a White Alkane is produced.

29. The method of claim 1, further comprising:
selecting said feed material that contains hydrocarbon chains with lengths of at least one of: C10 to C20, C20 to C30, C30 to C50, C50 to C70, C70 to C100;
purifying said first intermediate product;
wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said second intermediate product;

wherein said purifying causes impurities to be removed from said first intermediate product; and wherein a White Alkane is produced.

30. The method of claim 1, further comprising:

polymerizing said feed material using heat, a catalyst, or heat and a catalyst, prior to hydro-decarboxylating said feed material, and prior to hydro-deoxygenating said feed material;

purifying said first intermediate product;

wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said first intermediate product;

wherein said purifying causes impurities to be removed from said first intermediate product; and wherein a White Alkane is produced.

31. The method of claim 1, further comprising:

wherein said feed material is a carbon source that comes from the biosphere, atmosphere, or technosphere;

purifying said first intermediate product;

wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said first intermediate product;

wherein said purifying causes impurities to be removed from said first intermediate product; and wherein a White Alkane is produced.

32. The method of claim 1, further comprising:

wherein said feed material chosen from the group comprising: polymerized vegetable oils, polymerized fatty acids, and polymerized fatty acid esters, triglycerides, diglycerides, monoglycerides, organic esters or a mixture thereof;

purifying said first intermediate product;

wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said first intermediate product;

wherein said purifying causes impurities to be removed from said first intermediate product; and wherein a White Alkane is produced.

33. The method of claim 1, further comprising:

wherein said feed material chosen from the group comprising: soy, canola, castor, corn, cottonseed, crambe, linseed, olive, peanut, rapeseed, safflower, sunflower, tall oil fatty acid, coconut, palm; oils derived from seeds, pulp, beans, legumes, rinds, pits or any part of an oil bearing fraction of the intended plant; animal fats or fish oils, or a mixture thereof;

purifying said first intermediate product;

wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said first intermediate product;

wherein said purifying causes impurities to be removed from said first intermediate product; and wherein a White Alkane is produced.

34. The method of claim 1, further comprising:

wherein said feed material is a naturally occurring oil or material containing 50% or more of unsaturated fatty acid components including mono-, di-, and tri-unsaturated hydrocarbon chains, with a majority of their fatty acids in the C16-C22 range;

purifying said first intermediate product;

wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said first intermediate product;

wherein said purifying causes impurities to be removed from said first intermediate product; and wherein a White Alkane is produced.

35. A product, comprising:

a White Alkane;

wherein said White Alkane has carbon chains generally in a range of C10 to C100;

wherein said White Alkane has a viscosity in a range from 2 cSt to 1000 cSt at 40° C.;

wherein said White Alkane has a density from 810-890 kg/m$^3$ at 20° C. (using the standard test for density ASTM D-1298);

wherein said White Alkane has a pour point from −18-+3° C. (using the standard test for pour point ASTM D-97);

wherein said White Alkane has a flash point from 115-290° C. (using the standard test for flash point ASTM D-92);

wherein said White Alkane is made by a process comprising the steps of:

choosing a feed material, wherein said feed material is a tri-glyceride, di-glyceride, mono-glyceride, organic acid ester, organic acid, naturally occurring oil or material containing 50% or more of unsaturated fatty acid components including mono-, di-, and tri-unsaturated hydrocarbon chains, or a mixture of two or more of the above;

polymerizing said feed material using heat, a catalyst, or heat and a catalyst, prior to hydro-decarboxylating said feed material, and prior to hydro-deoxygenating said feed material;

hydro-decarboxylating said feed material;

hydro-deoxygenating said feed material;

separating a component from said feed material after hydro-decarboxylating said feed material, and after hydro-deoxygenating said feed material; and purifying said feed material after hydro-decarboxylating said feed material, and after hydro-deoxygenating said feed material.

36. The product of claim 35, further comprising:

wherein said separating step is accomplished by at least one of: solvent dewaxing, urea dewaxing, distilling, fractionating, fractional crystallization, or light fraction stripping said first intermediate product; and wherein said purifying step is accomplished by at least one of: hydro finishing, applying sulfur trioxide, applying oleum, sulfuric acid washing, bauxite filtration, clay-gel extraction, bentonite clay filtration, palygorskite mineral filtration, kaolin clay filtration, or activated carbon filtration said first intermediate product.

37. The product of claim 36, wherein:
said White Alkane is an inert, chemically stable compound; and
said White Alkane is generally colorless, oily, almost tasteless, water-insoluble liquid, and said White Alkanes contains 50% or more renewable carbon.

\* \* \* \* \*